US008343259B2

(12) United States Patent
Knaebel

(10) Patent No.: US 8,343,259 B2
(45) Date of Patent: Jan. 1, 2013

(54) MOISTURE MITIGATION IN PSA AIR FRACTIONATION

(75) Inventor: Seth Pemberton Knaebel, Plain City, OH (US)

(73) Assignee: WearAir Oxygen, Inc., Kelowna, British Columbia (CA)

( * ) Notice: Subject to any disclaimer, the term of this patent is extended or adjusted under 35 U.S.C. 154(b) by 327 days.

(21) Appl. No.: 12/748,511

(22) Filed: Mar. 29, 2010

(65) Prior Publication Data
US 2011/0232482 A1  Sep. 29, 2011

(51) Int. Cl.
*B01D 53/047* (2006.01)
(52) U.S. Cl. .................. 95/96; 95/117; 95/130
(58) Field of Classification Search .......... 95/1, 96, 95/117, 130, 148, 900, 902; 96/121, 132; 128/205.12, 205, 27, 205.24
See application file for complete search history.

(56) References Cited

U.S. PATENT DOCUMENTS

| 3,957,463 A * | 5/1976 | Drissel et al. ............. 95/103 |
| 4,013,429 A * | 3/1977 | Sircar et al. ............... 95/101 |
| 4,477,265 A * | 10/1984 | Kumar et al. ............... 95/26 |
| 4,539,019 A * | 9/1985 | Koch ........................... 95/19 |
| 4,715,867 A * | 12/1987 | Vo ............................... 95/101 |
| 5,395,427 A * | 3/1995 | Kumar et al. ............... 95/101 |
| 6,475,265 B1 * | 11/2002 | Baksh et al. ................ 95/96 |
| 7,160,367 B2 * | 1/2007 | Babicki et al. ............. 96/116 |
| 7,491,261 B2 * | 2/2009 | Warren et al. ............... 95/96 |

FOREIGN PATENT DOCUMENTS

| JP | 60-079150 | * | 5/1985 |
| JP | 2009-006256 A | * | 1/2009 |

OTHER PUBLICATIONS

Machine generated English translation of JP 2009-006256 A, published Jan. 2009.*

* cited by examiner

*Primary Examiner* — Frank Lawrence, Jr.
(74) *Attorney, Agent, or Firm* — Mueller Law, LLC; Jerry K. Mueller, Jr.

(57) ABSTRACT

Disclosed is a method for subjecting feed air to fractionation for recovery of a product oxygen fraction therefrom in a pressure swing adsorption (PSA) process utilizing a nitrogen-selective adsorbent ("NSA") that is sensitive to water. The PSA process includes the steps of feed pressurization, production, equalization, and blowdown. The improvement to this PSA process commences with placing a bed of pre-treatment adsorbent between feed air and a bed of NSA. Next, a controllable valve is interposed between the pre-treatment adsorbent bed and the NSA bed. Finally, the controllable valve is kept closed during the steps of production, equalization, and when the process is idle. An advantageous NSA is LiX zeolite, Li-LSX zeolite, CaX zeolite, and similar adsorbents, particularly highly hydrophilic zeolites. Another feature of the disclosed PSA cycle is that the pre-treatment adsorbent bed blows-down while the NSA bed equalizes.

10 Claims, 1 Drawing Sheet

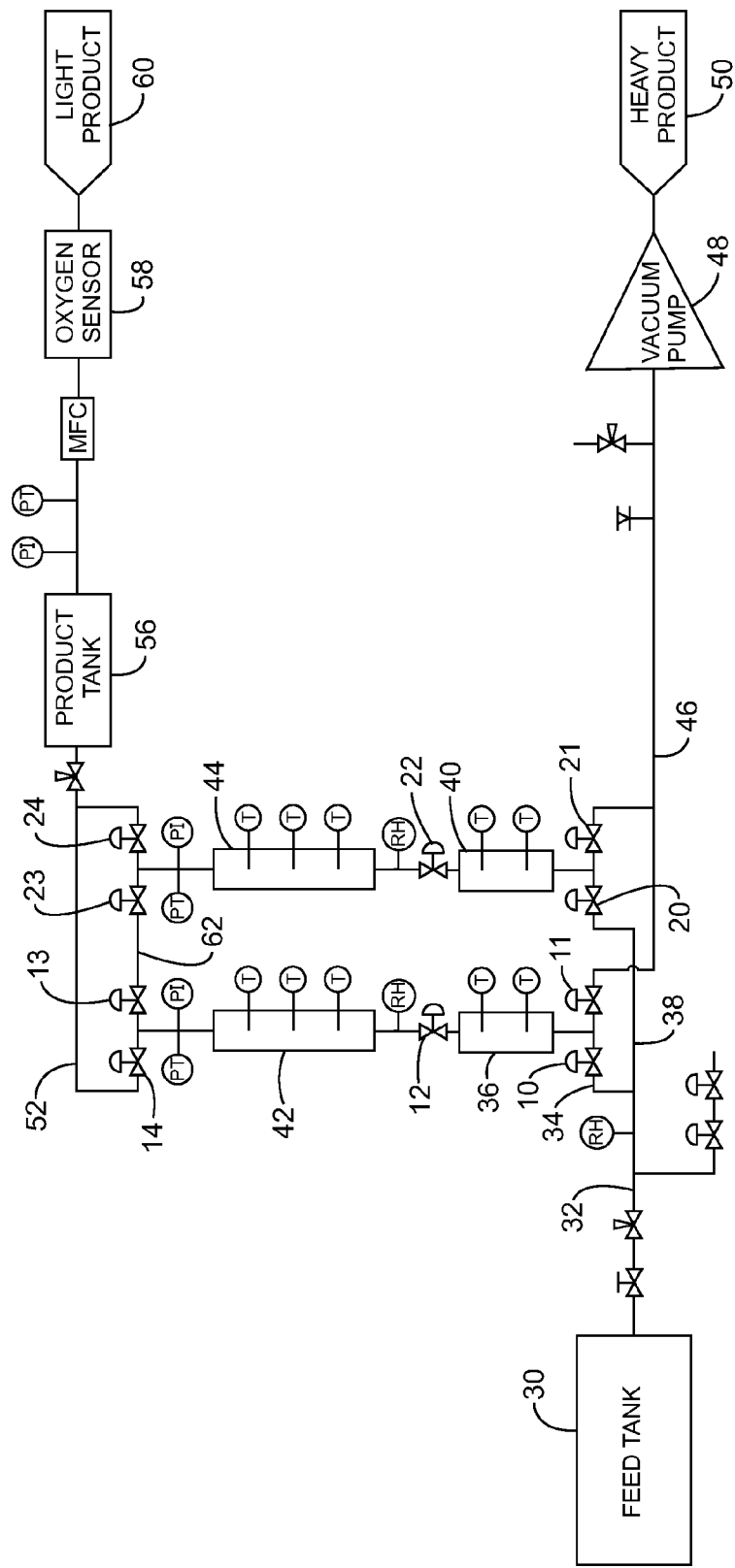

MOISTURE MITIGATION IN PSA AIR FRACTIONATION

CROSS-REFERENCE TO RELATED APPLICATIONS

This application is cross-referenced to commonly-assigned application Ser. No. 12/369,166, filed on Feb. 11, 2009, which is a division of U.S. Pat. No. 7,491,261.

STATEMENT REGARDING FEDERALLY SPONSORED RESEARCH

Not applicable.

BACKGROUND

In the field of gas concentrators it is known to use, for example, zeolite to adsorb adsorbate in a gas concentrator. The use of zeolite herein is intended to be exemplary. It would be known to one skilled in the art to tailor the use of a specific adsorbent, whether a particular type of zeolite or other adsorbent. As is known in the prior art, zeolite consists of molecular sized polyhedral cages. Oxygen and nitrogen molecules (for example) can access the inside of these cages through holes in the crystalline structure. The crystalline structure contains cations. Gas adsorption occurs when molecules respond to the forces of physisorption, which fall into two main categories: van der Waals (or dispersion) forces and electrostatic forces. The latter are prominent in attracting the gas molecules to these cations. Nitrogen molecules, for example, bind more strongly to the zeolite cations than do oxygen molecules. As a result, if a mixture of nitrogen and oxygen, such as found in atmospheric air, is pressurized into a chamber full of zeolite particles, nitrogen will adsorb into the zeolite particles more readily than does oxygen. There will be a higher concentration of oxygen in the empty space between the zeolite particles, (hereinafter referred to as zeolite void space), than there was in the original gas mixture.

Adsorption processes commonly employ fixed beds of adsorbent particles. These fixed beds are normally within a vessel, which when cylindrical is called a column. The adsorption process frequently operates cyclically in which uptake and release (regeneration) occur repeatedly. The adsorbent particles may be granules, beads, or pellets, as well as other diverse shapes. Being fixed implies that the adsorbent is generally stationary (held in place by gravity or other mechanical forces) while the fluid being treated flows between the adsorbent particles. Depending on the geometry, the flow direction may either be axial or radial, or in some other consistent direction, during a particular step in an adsorption cycle. Commonly, the flow direction reverses from one step in an adsorption cycle to the next, i.e., from upwards to downwards or from radially outwards to radially inwards, depending on the mechanical layout of the adsorption vessel.

In particular, LiX and LiLSX zeolites as adsorbents for nitrogen and oxygen, which are sensitive to moisture and carbon dioxide, as shown by Dr. J. C. Santos (Ph.D. dissertation in chemical engineering, University of Porto, Portugal, 2005). Dr. Santos conducted tests to determine the causes of loss of capacity of the adsorbents after being used in a pressure swing adsorption unit. H is study involved exposing the adsorbent to water vapor, or carbon dioxide, and both simultaneously. After regenerating it, he determined a nitrogen adsorption equilibrium point to assess the loss of efficiency.

U.S. Pat. No. 6,471,748 to Ackley discloses the removal of contaminants of air, typically water and carbon dioxide, in a pretreatment stage at the feed end of the adsorbent bed, by zeolites, activated alumina, activated carbon and/or silica gel. Highly-exchanged LiX zeolites are taught to be useful in the main stage of the disclosed process. Likewise, Rege, et al., "Limits for Air Separation by Adsorption with LiX Zeolite" Ind. Eng. Chem. Res. (1997), vol 36, pp. 5358-5365, teaches the use of a pretreatment bed to remove water and carbon dioxide from the feed gas before it enters the main LiX bed. Notaro, et al., in U.S. Pat. No. 5,810,909, also describe using layers of adsorbents to prevent deactivation of lithium-exchanged X zeolite. U.S. Pat. No. 6,824,590, to Dee, et al., shows different configurations of pretreatment layers, intended to protect lithium-exchanged X zeolite from deactivation by moisture or carbon dioxide.

Finally, U.S. Pat. No. 7,608,133 shows an adsorbent process for separating $CO_2$ from an air stream using LiX adsorbents where a passive, check valve is used between the LiX zeolite adsorbent bed and the LiX zeolite column.

None of this prior art suggests physically isolating the pretreatment layer(s) from the LiX or LiLSX layer(s) by means of a controllable (switchable) valve.

U.S. Pat. No. 7,491,261 discloses an improved sieve bed design to manage breakthrough and the mass transfer zone by way of volumetric division. Fractionation of air to recover a highly enriched oxygen fraction is an exemplary use of the '261 technology. An empty space in the product end is separated from adsorbent-filled sieve space in the feed end by a mid-diffuser plate. The ratio of the empty product end void space to the adsorbent filled sieve space within a sieve bed may be determined by the relative percentages of the gases to be separated and the bulk loading factor of the molecular sieve. A product end void space of the correct volume may ensure the maximum volume of nitrogen has been adsorbed before breakthrough occurs. In operation, pressure in the sieve bed empty space and sieve filled space may be equal at any instant. This contains breakthrough to the location of the mid-diffuser plate.

BRIEF SUMMARY

Disclosed is a method for subjecting feed air to fractionation for recovery of a product oxygen fraction therefrom in a pressure swing adsorption (PSA; see, for example, *Pressure Swing Adsorption*, D. M. Ruthven, S. Farooq, and K. S. Knaebel, VCH/Wiley, 1994) process utilizing a nitrogen-selective adsorbent ("NSA") that is sensitive to water. The PSA process includes the steps of feed pressurization, production, equalization, and blowdown. The complete cycle is specified in Table 1, below, in conjunction with FIG. 1. Certain terms used here are explained more fully in the Detailed Description section. The improvement to this PSA process commences with placing a bed of pre-treatment adsorbent between feed air and a bed of NSA. Next, a controllable valve (i.e., a active valve controllable by the operator and not a passive valve, such as a check valve) is interposed between the pre-treatment adsorbent bed and the NSA bed. Finally, the controllable valve is kept closed during the steps of production, equalization, and when the process is idle. An advantageous NSA is LiX zeolite, Li-LSX zeolite, CaX zeolite, and similar adsorbents, particularly highly hydrophilic zeolites. Another feature of the disclosed PSA cycle is that the pre-treatment adsorbent bed blows-down while the NSA bed equalizes.

The disclosed method further includes providing a plurality of chambers, each filled with a bed of pre-treatment adsorbent. The chamber from the oxygen fraction is withdrawn is fitted with a diffuser plate to provide an empty space from the product oxygen fraction is withdrawn.

BRIEF DESCRIPTION OF THE DRAWING

The drawing is a simplified flow diagram of how the disclosed process can be practiced. Instrumentation, controls, feeds, tanks, fittings, pumps, valves, and other auxiliary appurtenant equipment may not be shown, but are to be provided where necessary or desirable in conventional fashion. Materials of construction of this process are conventional. Thus, oxidation and corrosion-resistant materials, such as austenitic stainless steel, or the like, can be used where necessary. Ordinary carbon steel can be used where oxidation, corrosion, and/or erosion are inconsequential. Various of the tanks, columns, and lines illustrated can be in multiple, series, cascade, or parallel connected, for additional treating time and/or capacity. Additionally, certain components are optional, including, thermocouples, pressure indicators, relative humidity sensors, and the like.

DETAILED DESCRIPTION

Referring initially to the drawing, feed air from a feed source, 30, flows through a line, 32, optionally fitted with shutoff valve, pressure regulator, pressure readout, and/or similar components. Line 32 splits into a line, 34, for passing feed air through a first control valve, 10, and then into a pre-treatment adsorbent chamber, 36. Line 32 also splits in a line, 38, for passing feed air through a second control valve, 20, and then into a second pre-treatment adsorbent chamber, 40.

Pre-treatment adsorbent chamber 36 is in feed communication with a first adsorption column, 42, while pre-treatment adsorbent chamber 40 is in feed communication with a second adsorption column, 44. Each column 42 and 44 is filled with a bed of NSA, such as LiX or LiSx zeolite, for fractionating air into a product oxygen fraction (or light product) and a product nitrogen fraction (or heavy product). Neither product fraction is pure.

Pre-treatment adsorbent chamber 36 also is in fluid communication with an exhaust line, 46, through a controllable valve, 11; while pre-treatment adsorbent chamber 40 is in fluid communication with exhaust line 46, through a controllable valve, 21. Line 46 is optionally in communication with a vacuum pump, 48 and, thence, into a heavy product tank, 50. That is, application of vacuum may be advantageous, but it is not necessary to the fulfillment of the objectives of this application.

Interposed between pre-treatment adsorbent chamber 36 and column 42 is a controllable valve, 12. Interposed between pre-treatment adsorbent chamber 40 and column 44 is a controllable valve, 22. Valves 12 and 22 are controlled in such a manner that no moisture in pre-treatment adsorbent chambers 36 and 40 can be passed into either column 42 or 44 to poison the NSA bed housed therein.

To complete the drawing description, gas flow from column 42 passes through a controllable valve, 14, and then into either first line, 52, which is in communication with a product tank, 56. Product tank 56 can be in communication with an oxygen sensor, 58, and light product tank, 60. Gas exiting column 42 also can pass through a controllable valve, 13, a line, 62, another controllable valve, 23, and thence into column 44. From column 44, gas can flow through a controllable valve, 24, and thence into product tank 56. Gas exiting column 44 also can pass through a controllable valve, 23, a line, 62, another controllable valve, 13, and thence into column 42. As one who is skilled in the art will recognize, employing a bidirectional valve would permit the functions of valves 13 and 23 to be combined, eliminating one of the two.

Advantages of the placement of valves 12 and 22 are that: (a) the moisture contained in the pre-treatment adsorbent beds (36 and 40) is prevented from advancing during the "production" and "pressure equalization down" steps (steps 2 and 3, respectively, for column 42, and steps 5 and 6, respectively, for column 44, as shown in Table 1); (b) during the steps labeled "pressure equalization down" in Table 1 (step 3 for column 42, and step 6 for column 44), the associated pre-treatment adsorbent beds (36 and 40) commence their blowdown/evacuation steps. Note that the term "blowdown/evacuation" used in Table 1 refers to the columns filled with NSA. As one who is skilled in the art will immediately notice when considering Table 1 in conjunction with the drawing, the pre-treatment adsorbent-filled columns, 36 and 40, begin their blowdown/evacuation steps during the steps labeled 3 and 6, respectively.

In operating the system, the cycle and valving are detailed in Table 1, below.

TABLE I

Process Cycle & Valving

| | | | Valve Timing | | | | | | | | | |
|---|---|---|---|---|---|---|---|---|---|---|---|---|
| | Control | Column 42 & Pre-treatment Adsorbent Chamber 36 | | | | | Column 44 & Pre-treatment Adsorbent Chamber 40 | | | | | |
| Step | Criterion | Column 42 Step | 10 | 11 | 12 | 13 | 14 | 20 | 21 | 22 | 23 | 24 | Column 44 Step |
| 1 | Pressure | Feed Pressurization | x | | x | | | | x | x | | | Blowdown/Evacuation |
| 2 | Timer | Production | | | | | x | | x | x | | | Blowdown/Evacuation |
| 3 | Timer | Equalization Down | | x | | x | | | | | x | | Equalization Up |
| 4 | Pressure | Blowdown/Evacuation | | x | x | | | x | | | x | | Feed Pressurization |
| 5 | Timer | Blowdown/Evacuation | | x | x | | | | | | | x | Production |
| 6 | Timer | Equalization Up | | | | x | | | | x | | x | Equalization Down |

Valve Description*: Active During Steps:
AV10, AV20  Feed
AV11, AV21  Blowdown/Evacuation
AV12, AV22  Between Guard (Pre-treatment Adsorbent) Bed and Main NSA Column
AV13, AV23  Equalization Up or Down
AV14, AV24  Production
x = valve open
*AV is automatic or controllable valve.

In Table 1, "Control Criterion" refers to the type of criterion that is employed to determine when to close the specific valves, which are open during the relevant step. For example, in Step 3, valves 11, 13, and 23 close after a specific time interval. Other criteria could be employed, other than those listed in Table 1, to achieve the same ends. Simultaneously (or after a short delay to allow those valves to fully close), valves 11, 12, 20, and 22 are opened, commencing Step 4. Accordingly, those will close according to a certain pressure criterion for the pressure in column 44 (which is being pressurized with feed) being met.

Other process and equipment details can be found in U.S. Pat. No. 7,491,261, and other PSA air separation processes.

Among the classes of pre-treatment adsorbents that may be employed in columns 36 and 40 are, for example, silica gel, activated alumina, and/or hydrophilic zeolite, and the like. Specifically, zeolites 5A (CaA) and 13X (NaX) offer advantages that, the extent to which they are not contaminated by water (e.g., in a dry environment), they can be active in separating nitrogen from oxygen. That is, either would supplement the function of the NSA contained in columns 42 and 44. In addition, these materials have the capability to remove moisture to parts-per-million (ppm) levels, such that the degree of protection of the NSA is higher than that of the other pre-treatment adsorbents acting alone. In view of that, it may be advantageous to employ a layer of either silica gel or activated alumina (at the feed end) with a second layer of 5A or 13X zeolite (towards the product end).

Generally, for medical purposes, it is desirable to produce oxygen with a purity of about 90% or greater. Recognizing that argon contributes about 5% of the impurity, this means that nitrogen should be present in the purified product at about 5% or less. Industrial applications of this process will have their own purity criteria, as will be obvious to one skilled in the art. In all cases, there is an advantage to achieving high recovery of oxygen. This is because, for a particular delivery rate of purified oxygen, the higher the recovery, the less the amount of air that must be compressed, and therefore the lower the required power; additionally, the smaller the adsorption vessels and accordingly the less adsorbent required.

The nitrogen selective adsorbent (NSA) is important due to its selectivity for nitrogen over oxygen, in the separation of air. It is sensitive to the presence of water in that the NSA's selectivity (i.e., for nitrogen over oxygen) is severely adversely impacted. Appropriate NSA includes, for example, LiX zeolites, Li-LSX zeolites (the low silica version of LiX zeolites), CaX zeolites, and similar adsorbents, particularly highly hydrophilic zeolites. Additional information of LiX zeolites can be found in U.S. Pat. No. 7,300,899, and the art cited therein; and *Adsorbents: Fundamentals and Applications*, by R. T. Yang (John Wiley and Sons, 2003; ISBN 0471297410, pp. 44-48). U.S. Pat. No. 7,037,358 discusses zeolite sensitivity to water. Sufficient pre-treatment adsorbent is provided to completely adsorb the expected quantity of moisture anticipated in the air fed to the PSA fractionation process. Sufficient NSA is provided to adsorb the expected quantity of nitrogen anticipated in the air fed to the PSA fractionation process, to meet the oxygen purity and recovery targets. The capacity of the pre-treatment adsorbent of choice, obviously, will influence the amount of NSA required.

While the process and apparatus has been described with reference to various embodiments, those skilled in the art will understand that various changes may be made and equivalents may be substituted for elements thereof without departing from the scope and essence of the disclosure. In addition, many modifications may be made to adapt a particular situation or material to the teachings of the disclosure without departing from the essential scope thereof. Therefore, it is intended that the disclosure not be limited to the particular embodiments disclosed, but that the disclosure will include all embodiments falling within the scope of the appended claims. In this application all units are in the metric system and all amounts and percentages are by weight, unless otherwise expressly indicated. Also, all citations referred herein are expressly incorporated herein by reference.

I claim:

1. In a method for subjecting feed air to fractionation for recovery of a product oxygen fraction therefrom in a pressure swing adsorption (PSA) process utilizing a nitrogen-selective adsorbent ("NSA") that is sensitive to moisture, said PSA process including the steps of feed pressurization, production, equalization, and blowdown, the improvement which comprises the steps of:
    (a) placing a bed of pre-treatment adsorbent between feed air and a bed of NSA;
    (b) interposing a controllable valve between said pre-treatment adsorbent bed and said NSA bed;
    (c) locating an output controllable valve at the output of said NSA bed; and
    (d) keeping said output controllable valve open and said interposed controllable valve closed during the steps of production, equalization, and when the process is idle,
    production occurring only when said output controllable valve is open and said interposed controllable valve is closed, said output controllable valve being open only during production and not being open during feed pressurization, equalization, or blowdown.

2. The method of claim 1, wherein said NSA comprises a highly hydrophilic zeolite.

3. The method of claim 2, wherein NSA bed is composed of one or more of LiX zeolite, Li-LSX zeolite, or CaX zeolite.

4. The method of claim 1, further comprising providing a plurality of chambers, each filled with said bed of pre-treatment adsorbent, wherein a chamber containing said bed of NSA is fitted with a diffuser plate to provide an empty space in said chamber containing said bed of NSA.

5. The method of claim 1, wherein said pre-treatment adsorbent placed in said bed are one or more of silica gel, activated alumina, or hydrophilic zeolite.

6. The method of claim 1, wherein said product oxygen fraction comprises more than about 90% oxygen by volume.

7. The method of claim 3, further comprising providing a plurality of chambers, each filled with said bed of pre-treatment adsorbent, wherein a chamber containing said bed of NSA is fitted with a diffuser plate to provide an empty space in said chamber containing said bed of NSA.

8. The method of claim 3, wherein said pre-treatment adsorbent placed in said bed are one or more of silica gel, activated alumina, or hydrophilic zeolite.

9. The method of claim 1, wherein said pre-treatment adsorbent bed blows-down while said NSA bed equalizes.

10. The method of claim 3, wherein said pre-treatment adsorbent bed blows-down while said NSA bed equalizes.

* * * * *